Feb. 14, 1967  V. B. VAN BLERK  3,303,546
APPARATUS FOR TREATING FILAMENTARY MATERIAL IN A FLUID
Filed July 22, 1964
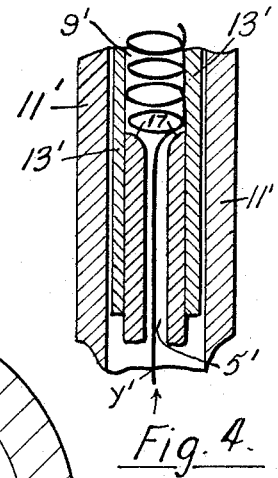
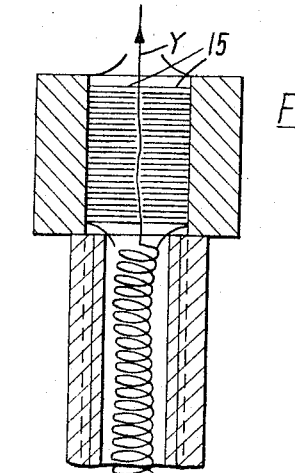
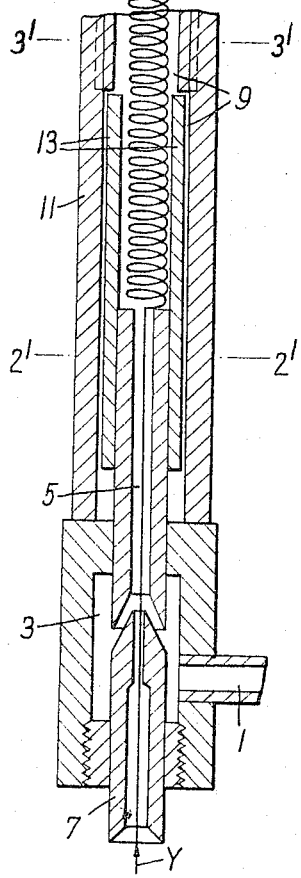
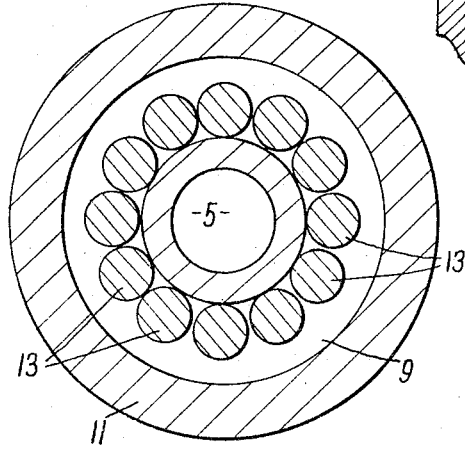
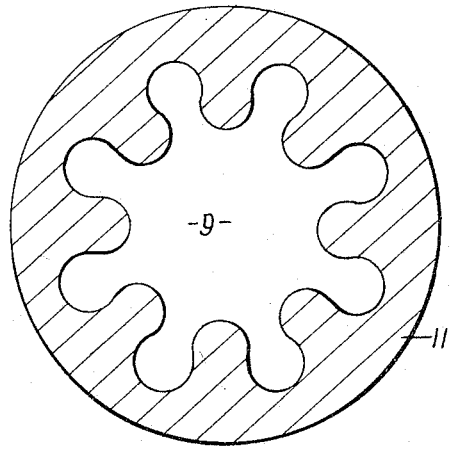
Inventor
Victor Bruce van Blerk
By
Cushman, Darby & Cushman
Attorneys United States Patent Office 3,303,546
Patented Feb. 14, 1967

3,303,546
APPARATUS FOR TREATING FILAMENTARY MATERIAL IN A FLUID
Victor Bruce Van Blerk, Sea Point, Cape Town, Cape Province, Republic of South Africa, assignor to British Nylon Spinners Limited, Pontypool England
Filed July 22, 1964, Ser. No. 384,505
5 Claims. (Cl. 28—1)

The invention concerns improvement in or relating to apparatus for treating filamentary material in a fluid.

Processes and apparatus are known in which filamentary material, e.g. continuous filament yarn, is treated in a fluid jet, to cause filamentary separation and consequent interlacing of the filaments or bulking of the yarn. The usual fluid is air; but other gases, such as steam, have also been used. Air jets have also been used to forward filamentary material, in place of the more usual feed-rolls, and/or to twist it.

The present invention is, however, concerned with the use of a novel fluid-treatment apparatus incorporating an air jet wherein filamentary material is concentrated thereby into a compact mass. The mass may subsequently be processed as such, as by heat treatment, or by winding or collection on to or inside a container; and either immediately or some time after such subsequent processing, the filamentary material may be withdrawn from such compact mass, the material being either substantially in its previous condition or in a different e.g. bulked, condition.

The invention is thus concerned with the use of specific fluid-treatment apparatus for the concentration of filamentary material, such concentration being either the main objective or a means to an end in which such concentration serves an integral purpose.

The invention consists in apparatus for treating filamentary material in a fluid, comprising a conduit for a fluid under pressure, means for entraining filamentary material within said conduit, a chamber leading out of said conduit downstream thereof and located within a tubular member, said chamber having a mean diameter greater than that of said conduit to allow for rapid expansion of said fluid therein, and fluid exhaust means in said chamber to allow for egress of said fluid independently of the egress of said filamentary material.

Preferably, said fluid exhaust means in said chamber is adapted to allow egress of said fluid in the axial direction of said chamber, as will be described in greater detail hereinafter in connection with the presently preferred embodiment of the apparatus.

It is within the scope of the invention to provide means to collect the filamentary material in a concentrated mass within a bag or a tubular container, on its emergence from the chamber, or to withdraw it from the chamber as a single strand. The collection within a tubular container may be temporary only, in that the filamentary material may be withdrawn continuously from the other end of the container as a single strand, e.g. by wind-up means. Whilst in a bag or a container, the material may be treated, as by dyeing, washing, setting in steam or with dry heat, or by impregnating with a dressing. For instance, drawn nylon yarn may be so treated on a draw-twister by collection within a tubular container immediately after leaving the draw roll, and the yarn allowed to relax whilst passing slowly through the container in a concentrated mass of layers of coils, relaxation being speeded, if required, by the application of heat to the yarn within the container. The yarn will then be wound up in a cheese or on a bobbin in the usual manner.

When the apparatus of the invention is required to serve as the means for forming the filamentary material into a concentrated mass and for packing said concentrated mass within a bag or other container, in plug form as it were, it is necessary that the transition zone between the high pressure conduit and the low pressure chamber shall be such as to allow for streamline flow of the fluid. A trumpet-shaped junction between conduit and chamber may serve for this purpose.

Contrarily, if the filamentary material, being a multi-filament single strand structure, is to be bulked as well as concentrated into a compact mass, said bulking being brought about by filament separation and looping, then it is necessary to arrange that the transition zone between conduit and chamber is a zone of fluid turbulence.

It is not necessary that there should be any physical impedance to the forward movement of the filamentary material within the chamber, other than that provided by friction between the material and the interior porions of the chamber, but a yielding impedance may be provided for. In such a case, the apparatus of the invention becomes more obviously analogous to the known apparatus for stuffer-box crimping, the fluid entrainment of the filamentary material taking the place of the feed rolls of the stuffer-box. However, the mode of packing of the filamentary material within the chamber in the apparatus of the invention is different from that of the stuffer box, in that the packing tends to be helical rather than corrugated, the direction of the helix reversing randomly at intrevals when the size of the chamber is great enough to permit this.

When concentrated filamentary material is extruded from the chamber into a collecting bag or basket, being an extension of the chamber, it may be necessary to arrange for the entry into the chamber of atmospheric air around the high-pressure fluid conduit, to prevent the formation of knots in the filamentary material.

As mentioned above, a collecting bag or basket may be attached to the open end of the chamber. The bag may be of knitted or woven fabric; and the basket may be of metal gauze. Alternatively, a tape may be wound around the extruded, concentrated mass of filamentary material. When a bag is employed, it may be one of great length which is formed by seaming a piece of fabric folded to form a tube in the vicinity of the open end of the chamber, and which can be wound up itself, on a core, when filled. When a basket is employed, it is preferred that it shall have a bottom as well as sides, because a bottom to the basket is useful in assisting the start-up of coiling within the chamber itself, when such is of a sizeable diameter, e.g. of about an inch or more.

The presently preferred embodiment of the invention will now be described with reference to the accompanying drawings, in which FIGURE 1 is a vertical section of the apparatus of the embodiment;

FIGURE 2 is a horizontal section through $2^1$—$2^1$ of FIGURE 1;

FIGURE 3 is a horizontal section through $3^1$—$3^1$ of FIGURE 1.

FIGURE 4 is a fragmentary vertical section, similar to FIGURE 1, showing a modified form of apparatus.

The embodiment relates to fluid treatment apparatus for crimping continuous filament yarns.

Inlet pipe 1 is for the supply of air under pressure into plenum chamber 3 and thence into conduit 5. Yarn inlet tube 7 comprises the means for entraining the yarn within the conduit 5; and the yarn, Y, is forwarded within the air stream down the conduit.

Chamber 9 is located within tubular member 11, and serves as a compression chamber in which the yarn is crimped.

The downstream end-portion of conduit 5 where it leads into chamber 9 is surrounded by a skirt or cage of straight rigid rods 13. These rods may be made of, for example, copper wire or nylon bristle. The internal diameter of the skirt or cage controls the diameter of the plug of yarn within it and restricts it to the axially mid-portion of the chamber, and this diameter, and that of the portion of the chamber 9 beyond the ends of the rods, must not be so great as to allow the plug, which assumes a helical configuration as shown diagrammatically in FIGURE 1, to cockle, buckle or double back on itself.

In order to allow for the air uniformly to expand radially as soon as it arrives in chamber 9, the rods of the skirt or cage are evenly and closely spaced around the periphery of the end-portion of conduit 5. The size of the rods is such as to provide them with sufficient rigidity not to splay outwardly unduly.

Beyond the end of the rods, the chamber 9 is internally fluted, as shown in FIGURE 3. A similar effect may be achieved by extending alternate rods of the cage down the full length of the chamber 9 in tubular member 11.

The combination of the skirt or cage and the fluting constitutes the fluid exhaust means for allowing egress of the air independently of the egress of the plug of yarn, in this instance the egress of air being in the axial direction of the chamber 9. If such independent egress of air were not allowed for, the back pressure of air built up behind the plug of compressed yarn would be such as to overcome the forwarding effect of the air under pressure in the conduit 5, certainly at the high speeds, 2000 feet/minute for instance, at which the apparatus is capable of processing yarn.

At the discharge end of the tubular member 11 is fitted a pile fabric tensioner 15, through the inwardly-facing pile of which the yarn can be positively withdrawn by means (not shown), for instance a wind-up roll. The pile fabric tensioner restricts the progression of the plug of yarn at the end of chamber 9, and it enables the single strand of yarn to be withdrawn substantially uniformly and without snarls.

The dimensions of an apparatus according to the embodiment which has been successful in crimping nylon multifilament yarn, are

| | | |
|---|---|---|
| Internal diameter of skirt or cage | mm | 2 |
| Internal diameter of conduit | mm | 1 |
| Internal diameter of chamber | mm | 4 |
| Diameter of rods in skirt or cage | mm | 0.5 |
| Length of chamber | cm | 10 |
| Internal diameter of fluted portion of chamber | mm | 3 |

As an alternative fluid exhaust means for allowing the independent egress of the fluid, the chamber may have a longitudinal slot in its periphery, or, alternatively, it may have a proportion of its periphery cut away and a gauze circlet surrounding it to ensure that the filamentary material remains within the chamber. Again, the walls of the chamber may be perforated, or be made of perforate material. The compacted mass of filamentary material within the chamber will tend to block the slot or holes, and hence the pressure of fluid, e.g., air or steam, behind the mass will increase somewhat after start-up and will be effective in moving the compacted mass along the chamber. Owing to the fact that the control of the pressure will necessarily be less positive than in the arrangement of the preferred embodiment, such means allowing radial egress of the fluid may not be desirable in circumstances, such as in crimping, where uniformity of pressure is necessary.

If the conduit leads into the chamber from an eccentric position, the filamentary material will tend to be formed into coils sloping diagonally forward within the chamber, rather than into coils nearly perpendicular to the axis of the chamber as is the case with a concentric conduit and chamber. Further if the chamber is of non-circular cross-section, e.g., it is rectangular or elliptical in cross-section, the crimp when the apparatus is used under conditions suitable for crimping, will be likely to be of a more zig-zag nature than when the cross-section of the chamber is circular.

As shown in FIGURE 4, wherein primed reference numerals designate parts which are similar to those designated by the reference numerals of FIGURE 1, the transition zone between the high pressure conduit and the low pressure chamber may be shaped to allow for streamlined flow of the fluid. This may be accomplished by forming the end of the conduit 5' in a trumpet shape, as seen at 17.

Although filamentary material has been referred to throughout, it is to be understood that that expression includes yarn-like strands composed of staple fibres.

The apparatus of the invention may be used to draw a converged filament bundle of undrawn filaments of polyhexamethylene adipamide, the filament bundle being forwarded, at a rate sufficient to draw the filaments, by means of a compressed air conduit leading into an expansion chamber of 1¼ inch internal diameter, wherein the bundle is caused to form itself into a concentrated, plug-like mass. A gauze basket may be fastened to the open end of the chamber for collection of the concentrated mass, the basket being doffed, and replaced by an empty one, when filled.

Although nylon filaments have been referred to specifically above, it is to be understood that the invention is not limited to any particular filamentary material, nor to any particular fluid so long as the fluid has no harmful effect on the filamentary material in question. It is, however, preferred to use air at room temperature because of its cheapness and ready availability.

I claim:
1. Apparatus for treating filamentary material in a fluid, comprising
   (a) a conduit for a fluid under pressure,
   (b) means for entraining filamentary material within said conduit,
   (c) means defining a chamber leading out of said conduit downstream thereof and located within a tubular member, said chamber having a mean diameter greater than that of said conduit,
   and (d) fluid exhaust means in said chamber including a skirt of rods extending parallel to the axis of said conduit for restricting the filamentary material to the axially mid-portion of said chamber and for allowing said fluid to exhaust between and radially outwardly of the rods of said skirt and thence axially out of said chamber.

2. Apparatus according to claim 1 and adapted to operate as a stuffer-box crimper, having means at the downstream end of said chamber yieldingly to impede the forward movement of filamentary material within said chamber.

3. Apparatus according to claim 2 in which said means at the downstream end of said chamber consists of a pile fabric tensioner having two inwardly-facing pile surfaces through which the filamentary material is withdrawn as a single strand.

4. Apparatus as in claim 1 wherein said chamber is imperforate and is provided with internal flutes downstream of said rods.

5. Apparatus as in claim 1 wherein the junction between said conduit and said chamber is trumpet shaped to allow for streamline flow of fluid.

References Cited by the Examiner

UNITED STATES PATENTS 3,121,935   2/1964   Shattuck et al. _____ 28—72

FOREIGN PATENTS 1,289,491   2/1962   France.
953,782   4/1964   Great Britain.

MERVIN STEIN, *Primary Examiner.*

DONALD W. PARKER, *Examiner.*

L. K. RIMRODT, *Assistant Examiner.*